(12) United States Patent
Saiya et al.

(10) Patent No.: US 11,788,836 B2
(45) Date of Patent: Oct. 17, 2023

(54) ALIGNMENT TOOL

(71) Applicant: JPMORGAN CHASE BANK, N.A., New York, NY (US)

(72) Inventors: Brian M. Saiya, Parker, CO (US); Paul Jurina, Aurora, CO (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 795 days.

(21) Appl. No.: 16/555,457

(22) Filed: Aug. 29, 2019

(65) Prior Publication Data
US 2021/0063154 A1    Mar. 4, 2021

(51) Int. Cl.
*G01C 15/00* (2006.01)
*G01B 11/14* (2006.01)

(52) U.S. Cl.
CPC .......... *G01C 15/004* (2013.01); *G01B 11/14* (2013.01)

(58) Field of Classification Search
CPC .. G01C 15/004; G01C 15/006; G01C 15/105; G01C 15/12; G01B 11/14
See application file for complete search history.

(56) References Cited

U.S. PATENT DOCUMENTS

| | | | | |
|---|---|---|---|---|
| 4,703,563 A * | 11/1987 | Hoshino | ............. | G01C 15/004 33/227 |
| 5,604,987 A * | 2/1997 | Cupp | ............. | G01C 15/008 33/290 |
| 5,713,135 A * | 2/1998 | Acopulos | ............. | G01C 15/008 33/286 |
| 6,442,856 B1 * | 9/2002 | Warner | ............. | B43L 7/12 33/429 |
| 6,823,600 B1 * | 11/2004 | Vaughan | ............. | G01C 15/004 33/529 |
| 7,159,328 B1 * | 1/2007 | Duda | ............. | B43L 7/14 33/484 |
| 7,219,437 B2 * | 5/2007 | Dallman | ............. | B43L 7/002 33/286 |
| 7,240,437 B1 * | 7/2007 | Moldovan | ............. | B25H 7/005 33/529 |
| 7,322,229 B2 * | 1/2008 | Wilhelm | ............. | G01B 11/306 73/104 |
| 7,335,280 B2 * | 2/2008 | Lampi | ............. | G01B 11/306 356/600 |
| 9,032,637 B2 * | 5/2015 | Propp | ............. | B25H 7/04 33/669 |
| 9,579,556 B2 * | 2/2017 | Austin | ............. | G02B 27/20 |
| 9,683,381 B1 * | 6/2017 | Becker | ............. | E04G 21/1891 |
| 10,436,586 B1 * | 10/2019 | Davis | ............. | B43L 7/005 |
| 10,683,670 B1 * | 6/2020 | Rush | ............. | E04F 21/18 |

(Continued)

*Primary Examiner* — Yaritza Guadalupe-McCall
(74) *Attorney, Agent, or Firm* — GREENBERG TRAURIG LLP

(57) ABSTRACT

Alignment tools are disclosed. According to one embodiment, an alignment tool may include a vertical member comprising a front surface, a back surface, and upper surface between the front surface and the back surface, wherein at least a portion of the upper surface is angled, and at least a portion of the upper surface comprising a reference marker centered along a length of the upper surface; and a plurality of horizontal members attached to the vertical member. The alignment tool may be configured to interact with a laser beam emitted by a laser source such that the vertical member is in alignment when the reference marker is aligned with the laser beam.

20 Claims, 6 Drawing Sheets

(56) References Cited

U.S. PATENT DOCUMENTS

| | | | | |
|---|---|---|---|---|
| 2001/0049879 A1* | 12/2001 | Moore, Jr. | ........... | G01C 15/008 33/376 |
| 2006/0168828 A1* | 8/2006 | Dallman | ................ | B42F 9/004 33/286 |
| 2006/0168830 A1* | 8/2006 | Dallman | ................ | B43L 3/001 33/286 |
| 2007/0011894 A1* | 1/2007 | Chen | .................... | G01C 15/004 33/286 |
| 2007/0175882 A1* | 8/2007 | Dallman | ................ | B43L 7/002 219/222 |
| 2008/0134530 A1* | 6/2008 | Hoeppner | ............... | G01C 9/28 33/416 |
| 2012/0148349 A1* | 6/2012 | Grover | ................... | E02D 13/04 405/232 |
| 2016/0018206 A1* | 1/2016 | Hollis | ..................... | G01C 9/28 33/354 |
| 2016/0109218 A1* | 4/2016 | Austin | .................... | G01B 5/14 33/275 R |
| 2016/0222684 A1* | 8/2016 | Titcomb | ................ | E04G 17/001 |
| 2021/0063154 A1* | 3/2021 | Saiya | ................... | G01C 15/004 |

* cited by examiner

ALIGNMENT TOOL

BACKGROUND OF THE INVENTION

1. Field of the Invention

The present disclosure generally relates to an alignment tool.

2. Description of Related Art

More and more organizations are moving to facilities that have poured concrete slabs. For example, data centers and the house rows and rows of servers and other electronics that must be arranged in a certain manner in order to optimize airflow and cooling. The poured-concrete floors, however, do not tiles or other reference points that assist in such arrangement.

SUMMARY OF THE INVENTION

Alignment tools are disclosed. According to one embodiment, an alignment tool may include a vertical member comprising a front surface, a back surface, and upper surface between the front surface and the back surface, wherein at least a portion of the upper surface is angled, and at least a portion of the upper surface comprising a reference marker centered along a length of the upper surface; and a plurality of horizontal members attached to the vertical member. The alignment tool may be configured to interact with a laser beam emitted by a laser source such that the vertical member is in alignment when the reference marker is aligned with the laser beam.

In one embodiment, the horizontal members may be slidably attached to a lower surface of the vertical member, may be fixed to the lower surface of the vertical member, may be attached to sides of the vertical member, etc.

In one embodiment, the vertical member may have a trapezoidal shape.

In one embodiment, the reference marker may include a solid line, a broken line, etc.

In one embodiment, the vertical member may be configured to abut, or be adjacent to, a piece of equipment to be aligned.

According to another embodiment, an alignment tool may include a vertical member; and a plurality of horizontal members attached to the vertical member, at least one of the horizontal members comprising at least one alignment mark on a top surface thereof. The alignment tool may be configured to interact with a laser beam emitted by a laser source such that the vertical member is in alignment when the alignment mark is aligned with the laser beam.

In one embodiment, the horizontal members are slidably attached to a lower surface of the vertical member.

In one embodiment, the horizontal members may be slidably attached to a lower surface of the vertical member, may be fixed to the lower surface of the vertical member, may be attached to sides of the vertical member, etc.

In one embodiment, the vertical member may have a trapezoidal shape.

In one embodiment, the alignment mark may include a solid line, a broken line, etc.

In one embodiment, the vertical member may be configured to abut, or be adjacent to, a piece of equipment to be aligned.

According to another embodiment, a method for equipment alignment may include: (1) positioning a reference generator generating a reference within an area to have equipment aligned within; (2) aligning an alignment tool comprising a vertical member and a plurality of horizontal members attached to the vertical member with the reference generated by the reference generator; (3) positioning a piece of equipment adjacent to the vertical member; and (4) securing the piece of equipment from movement.

In one embodiment, the method may further include: before securing the piece of equipment from movement, positioning a second reference generator generating a second reference within the area; aligning a second alignment tool comprising a second vertical member and a second plurality of horizontal members attached to the second vertical member with the second reference generated by the reference second generator; and positioning the piece of equipment adjacent to the second vertical member.

In one embodiment, the second reference may be perpendicular to the first reference.

In one embodiment, the vertical member may include a front surface, a back surface, and upper surface between the front surface and the back surface, wherein at least a portion of the upper surface is angled, and at least a portion of the upper surface comprising a reference marker centered along a length of the upper surface, and the alignment tool may be configured to interact with the reference source such that the vertical member is in alignment when the reference marker is aligned with the reference.

In one embodiment, at least one of the horizontal members may include at least one alignment mark on a top surface thereof, and wherein the alignment tool may be configured to interact with the reference such that the vertical member is in alignment when the alignment mark is aligned with the reference.

In one embodiment, the reference generator may be a laser source generating a laser beam.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Alignment tools and methods of use are disclosed.

Figure 1A:
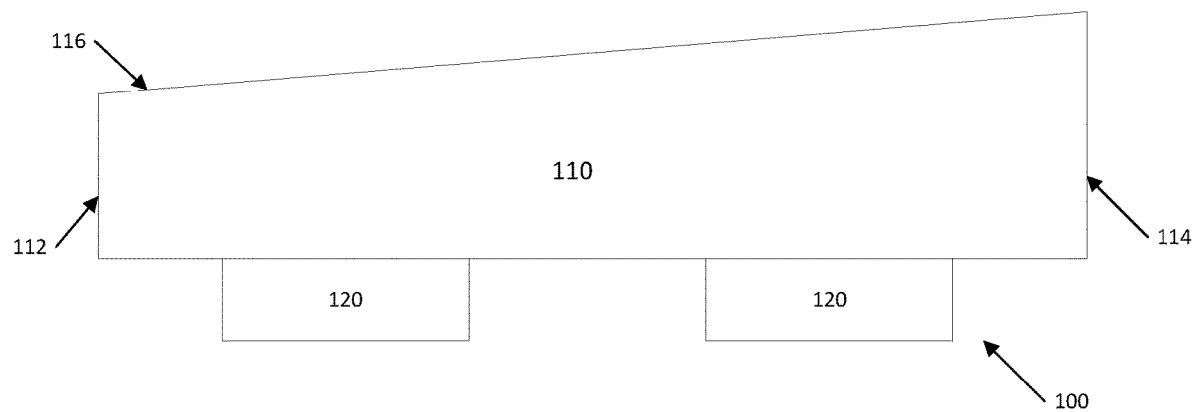
FIGS. 1A-1C disclose an alignment tool according to one embodiment.
Figure 1B:
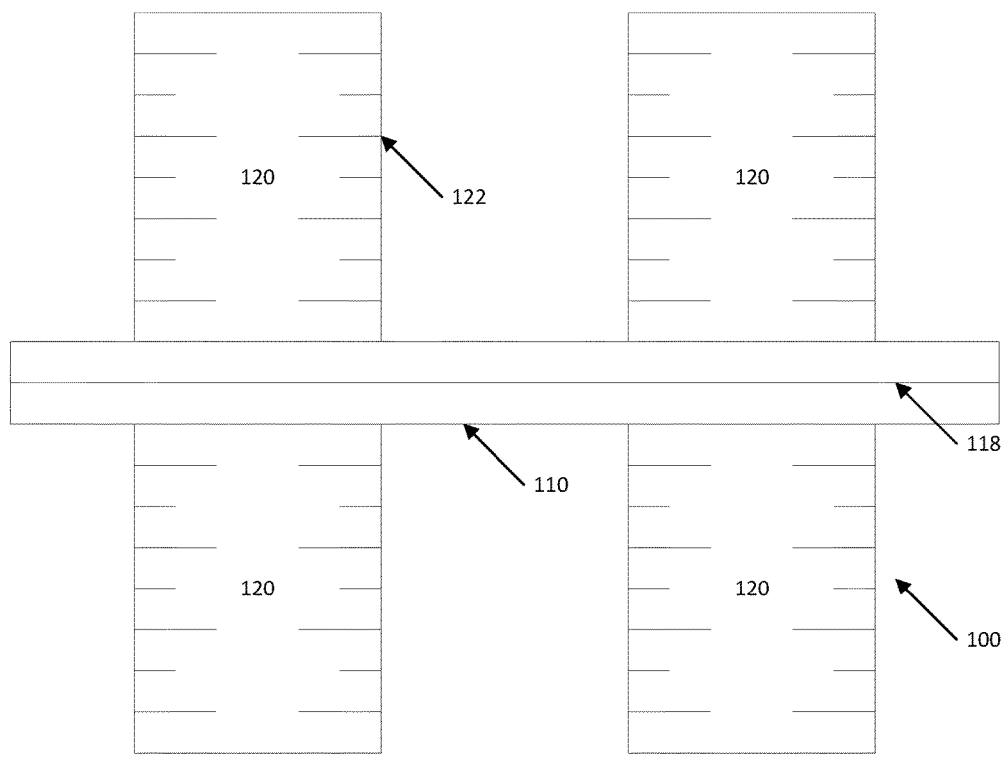
Figure 1C:
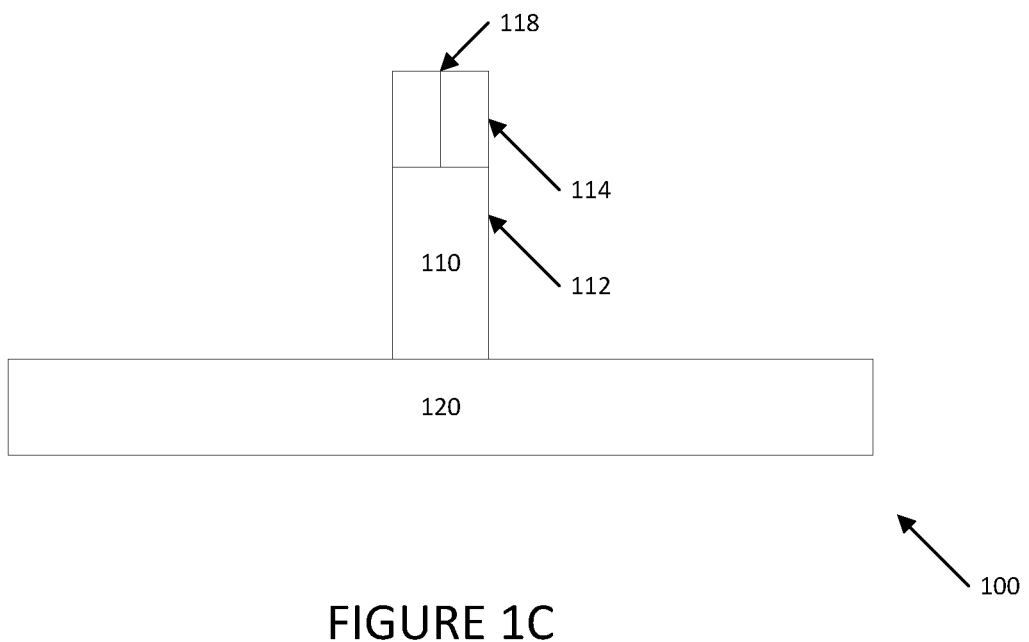

Referring to FIGS. 1A-C, an alignment tool is provided according to one embodiment. FIG. 1A depicts side view of alignment tool 100, FIG. 1B depicts a top view of alignment tool 100, and FIG. 1C depicts a front view of alignment tool 110.

Alignment tool 100 may include vertical member 110 and horizontal members 120. Although two horizontal members 120 are shown, it should be recognized that one horizontal member 120 may be provide, as may a greater number of horizontal members 120.

Vertical member 110 may have a trapezoidal shape such that front surface 112 of vertical member 110 may be shorter than back surface 114. Angled surface 116 may comprise at least part of the upper surface between front surface 112 and back surface 114. Angled surface 116 may include reference marker 118, which may be a solid like, a dashed line, and the like, and may provide a reference for aligning alignment tool 110 with a reference, such as a laser alignment line produced by a laser source.

In one embodiment, reference marker 118 may only be provided on a portion of angled surface 116.

Horizontal members 120 may have a height and/or thickness to interact with equipment to be aligned. In one embodiment, equipment to be aligned (not shown) may be positioned adjacent to vertical member 110 to have at least one side that is parallel to vertical member 110. In another embodiment, one or more horizontal members 120 may be marked with one or more alignment mark 122 so that horizontal members 120 may be used to position equipment that may be offset from vertical member 110.

Horizontal members 120 may be attached to vertical member 110 in any suitable manner. In one embodiment, members 120 may fixed to a lower surface of vertical member 110. In another embodiment, one or more horizontal members 120 may be slidably mounted to a lower surface of vertical member 110 so that horizontal members 120 may be moved to accommodate openings under equipment to be positioned.

In one embodiment, one or more horizontal members 120 may be removeable from vertical member 110.

In one embodiment, the dimensions of vertical member 110, including the height of front surface 112 and back surface 114, as well as the length, width, and height of horizontal members 120 may be selected as is necessary and/or desired. Exemplary, non-limiting dimensions for vertical member 110 include a length of 24 inches. Front face 112 may have a height of 2 inches, and back face 114 may have a height of 4 inches. The width of vertical member 110 may be 1 inch. Horizontal members 120 may have a height of 1 inch, a width of 4 inches, and a length of 6 inches.

Vertical member 110 and horizontal members 120 may be made of any suitable material. In one embodiment, the material may resist warping.

Figure 2:
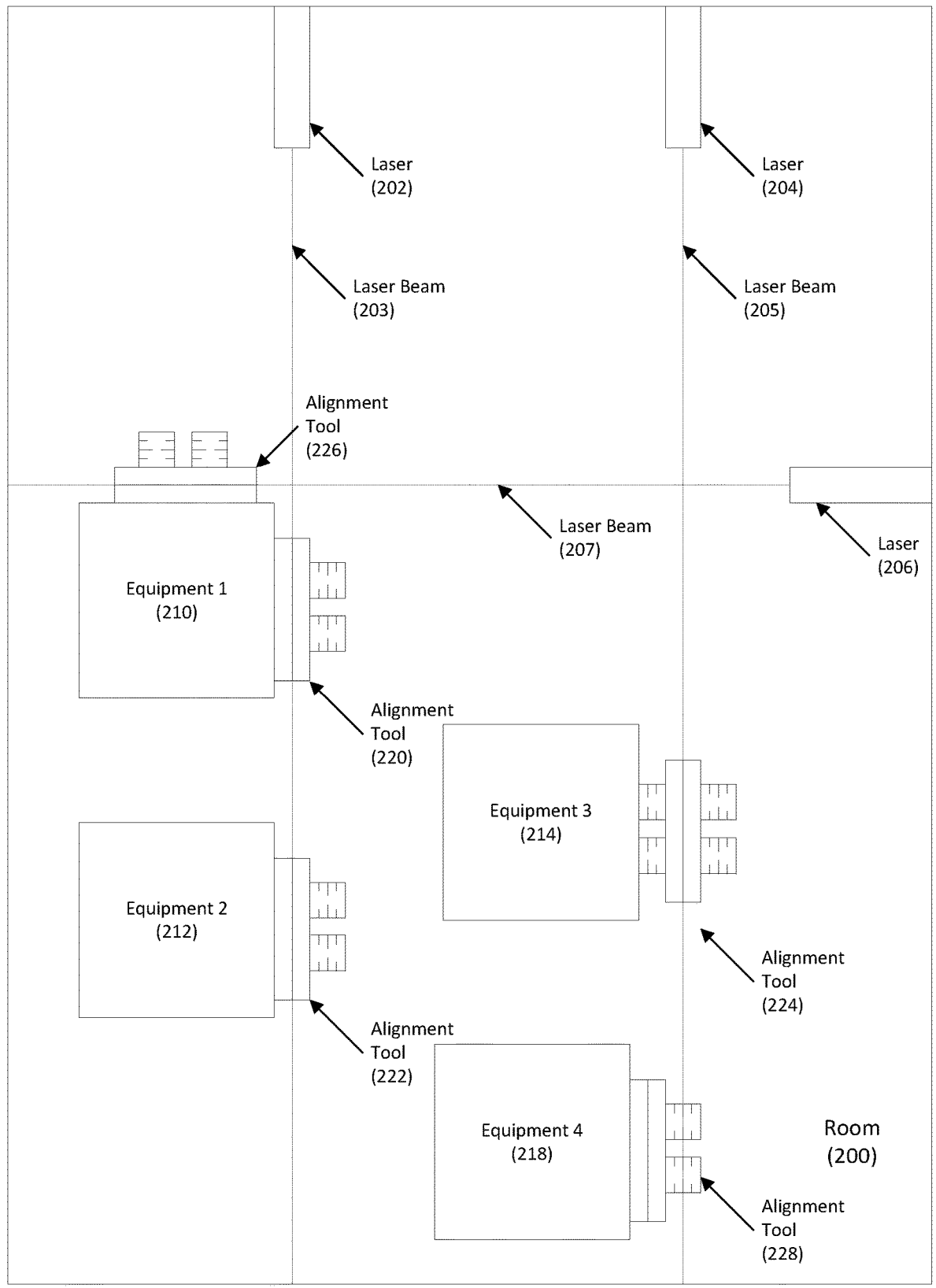
FIG. 2 discloses an alignment tool environment according to one embodiment.

Referring to FIG. 2, an illustration of an environment for the alignment tool is provided according to one embodiment. Room 220 may be a room with no fixed reference points, such as a poured concrete floor.

In FIG. 2, four pieces of equipment (210, 212, 214, 218) are being aligned. It should be recognized that the number of pieces of equipment, sizes, etc. is illustrative only.

Reference (e.g., laser) sources (202, 204, 206, 208) are provided for generating laser beams 203, 205, and 207, respectively. Laser beams 203, 205, 207 may be beams, laser lines, etc. In one embodiment, laser sources 202, 204, 206 may be positioned so that they point slightly downward, thereby generating a line an inclined surface.

Each piece of equipment 210, 212, 214, 218 may be provided with one or more alignment tools 220, 222, 224, 228. The reference lines on the angled surfaces of the vertical members of the alignment tools 220, 222, 224, 226 may be aligned with one of laser beams 203, 205, or 207, and equipment 210, 212, 214 is may be positioned adjacent to the respective alignment tools (e.g., equipment 1 210 is positioned adjacent to the vertical members of alignment tools 220 and 226), or may be offset from the vertical member using one more of alignment mark, or graduations, on the horizontal members of the alignment tool (e.g., equipment 3 214 is offset from the vertical member of alignment tool 224). In another embodiment, equipment 4 218 may be positioned adjacent the vertical member of alignment tool 228, and one or more reference mark, or graduation, on one or more horizontal members of alignment tool 228 may be aligned with laser beam 205.

Figure 3:
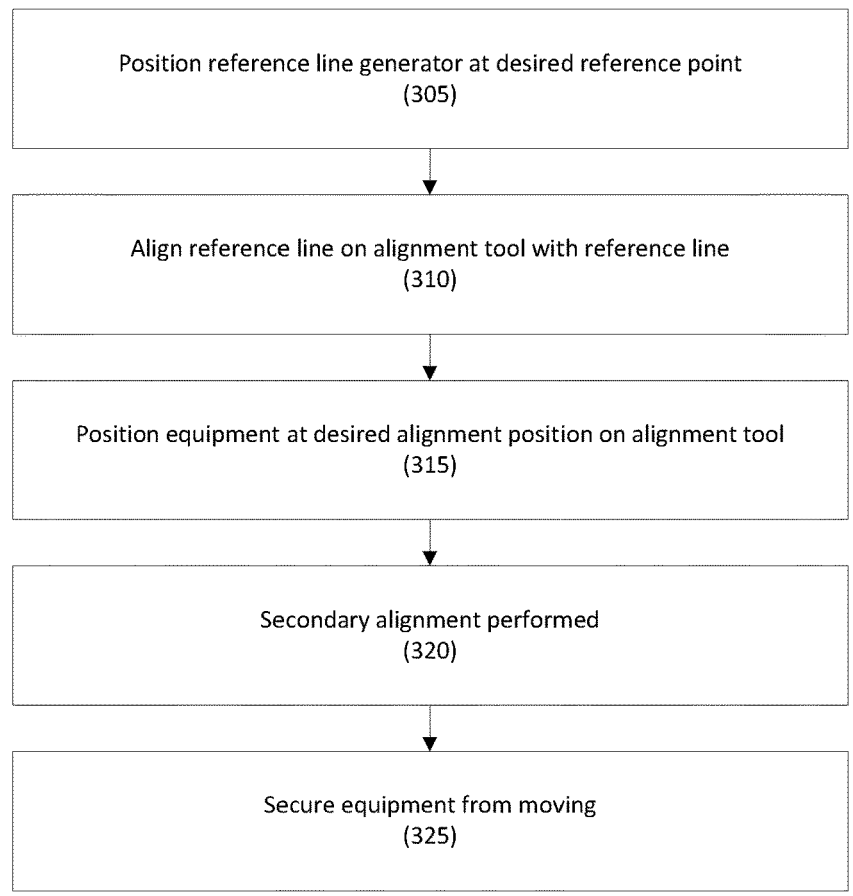
FIG. 3 discloses a method for using an alignment tool according to one embodiment.

Referring to FIG. 3, a method for equipment alignment using an alignment tool is provided according to one embodiment.

In step 305, a reference generator may be positioned within the area in which the equipment is to be aligned. For example, along a perimeter of a room, one or more laser line generators may be positioned so that that laser line generator provides an alignment reference for an edge of the equipment.

In another embodiment, if a laser line generator is not used, a laser may be positioned at a slight downward angle.

In step 310, the alignment tool may be positioned in the path of the laser. In one embodiment, the reference marker, such as a line, on the angled surface of the vertical member may be aligned with the laser. For example, due to the angled top surface, the entire reference line should be illuminated with the laser.

In another embodiment, one or more reference marks on the horizontal members of an alignment tool may be aligned with the laser.

In step 315, the equipment may be positioned relative to the vertical member of the alignment tool. In one embodiment, the equipment may be positioned adjacent the vertical member, or it may be offset from the vertical member using, for example, the alignment marks or graduations on the horizontal members.

In step 320, any secondary alignment may be performed. For example, if the first alignment as performed in the X direction, the secondary alignment may be performed in the Y direction. While maintaining the X alignment, a second laser line generator may be used with a second alignment tool to align the equipment in the Y direction.

In step 325, the equipment may be secured from movement. For example, the equipment's wheels may be locked, the equipment may be lowered, or any other action necessary to prohibit or restrict movement of the equipment may be performed.

Figure 4A:
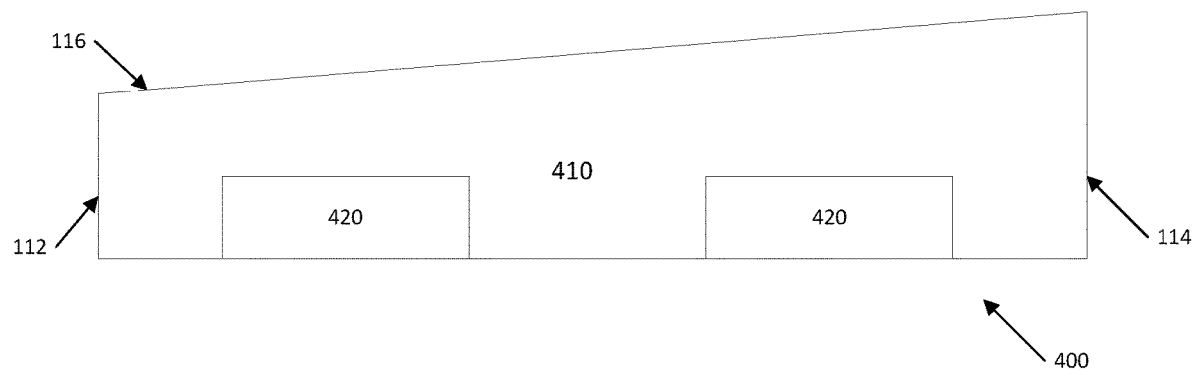
FIGS. 4A-4C disclose an alignment tool according to another embodiment.
Figure 4B:
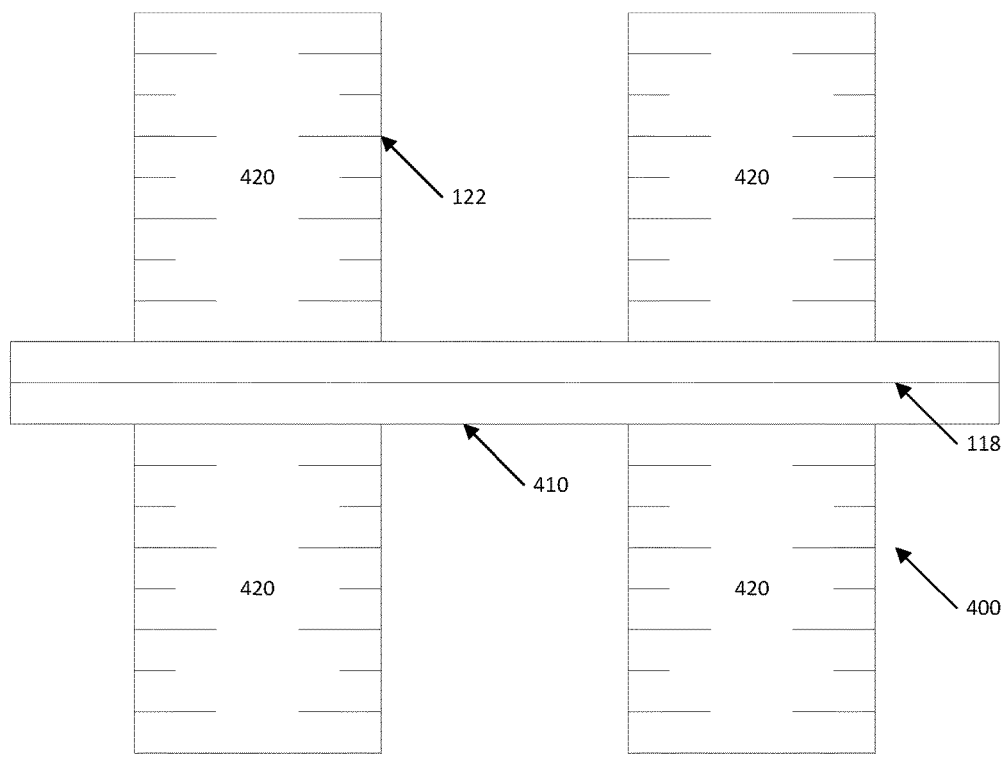
Figure 4C:
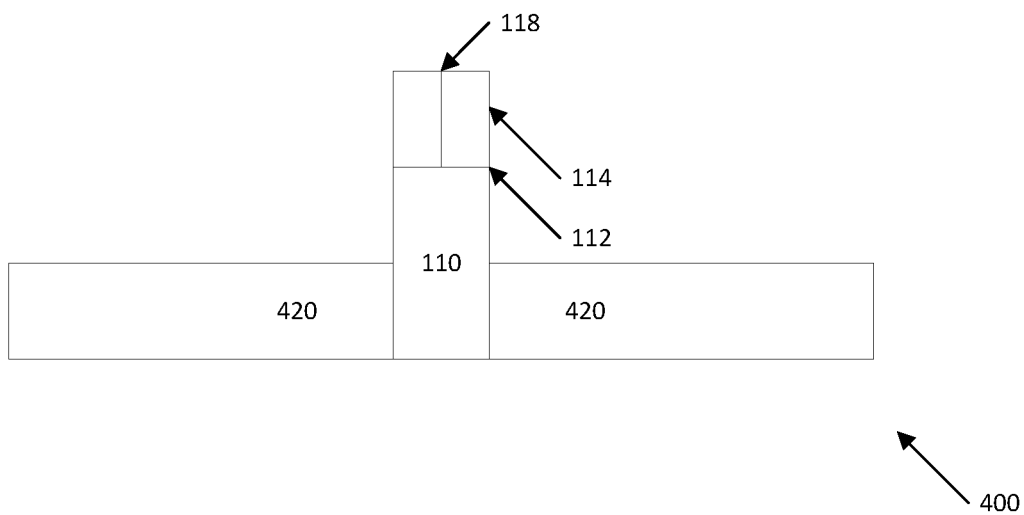

Referring to FIGS. 4A-C, an alignment tool is provided according to another embodiment. Alignment tool 400 is similar to alignment tool 100 except vertical member 410 and horizontal members 420 interact differently. For example, horizontal members 420 are not mounted on a lower surface of vertical member 410, but may be instead mounted to sides of vertical member. Thus, four horizontal members 420 may be provided.

In another embodiment, recesses (not shown) may be provided in the lower surface of vertical member 410 for mounting horizontal members 420. Thus, only two horizontal members 420 may be provided.

Alignment tool 400 may be used in the same manner as alignment tool 100.

Note that the dimensions, shapes, ratios, etc. disclosed herein are exemplary only, and any suitable dimension, shape, or ratio may be used as is necessary and/or desired.

Hereinafter, general aspects of implementation of the systems and methods of the invention will be described.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. An alignment tool, comprising:
   a vertical member comprising a front surface, a back surface, and upper surface between the front surface and the back surface, wherein at least a portion of the upper surface is angled, and at least a portion of the upper surface comprises a reference marker centered along a length of the upper surface and the vertical member is configured to abut a piece of equipment to be aligned; and
   a plurality of horizontal members attached to the vertical member;
   wherein the alignment tool is configured to interact with a laser beam emitted by a laser source such that the vertical member is in alignment when the reference marker is aligned with the laser beam.

2. The alignment tool of claim 1, wherein the horizontal members are slidably attached to a lower surface of the vertical member.

3. The alignment tool of claim 1, wherein the horizontal members are attached to sides of the vertical member.

4. The alignment tool of claim 1, wherein the vertical member has a trapezoidal shape.

5. The alignment tool of claim 1, wherein the reference marker comprises a solid line.

6. The alignment tool of claim 1, wherein the reference marker comprises a broken line.

7. An alignment tool, comprising:
   a vertical member that is configured to abut a piece of equipment to be aligned on a horizontal surface; and
   a plurality of horizontal members attached to the vertical member, at least one of the horizontal members comprising at least one alignment mark on a top surface thereof;
   wherein the alignment tool is configured to interact with a laser beam emitted by a laser source such that the vertical member is in alignment relative to an external reference point provided by the laser source when the alignment mark is aligned with the laser beam.

8. The alignment tool of claim 7, wherein the horizontal members are slidably attached to a lower surface of the vertical member.

9. The alignment tool of claim 7, wherein the horizontal members are attached to sides of the vertical member.

10. The alignment tool of claim 7, wherein the vertical member has a trapezoidal shape.

11. The alignment tool of claim 7, wherein the alignment mark comprises a solid line.

12. The alignment tool of claim 7, wherein the alignment mark comprises a broken line.

13. The alignment tool of claim 7, wherein the horizontal surface comprises a floor of a data center.

14. The alignment tool of claim 7, wherein the equipment comprises electronic equipment.

15. A method for equipment alignment, comprising:
    positioning a first reference generator generating a first reference within an area to have equipment aligned within;
    aligning an alignment tool comprising a vertical member and a plurality of horizontal members attached to the vertical member with the reference generated by the reference generator;
    positioning a piece of equipment adjacent to the vertical member; and
    securing the piece of equipment from movement.

16. The method of claim 15, further comprising:
    before securing the piece of equipment from movement, positioning a second reference generator generating a second reference within the area;
    aligning a second alignment tool comprising a second vertical member and a second plurality of horizontal members attached to the second vertical member with the second reference generated by the reference second generator; and
    positioning the piece of equipment adjacent to the second vertical member.

17. The method of claim 16, wherein the second reference is perpendicular to the first reference.

18. The method of claim 15, wherein the vertical member comprises a front surface, a back surface, and upper surface between the front surface and the back surface, wherein at least a portion of the upper surface is angled, and at least a portion of the upper surface comprising a reference marker centered along a length of the upper surface, and wherein the alignment tool is configured to interact with the first reference such that the vertical member is in alignment when the reference marker is aligned with the first reference.

19. The method of claim 15, wherein at least one of the horizontal members comprises at least one alignment mark on a top surface thereof, and wherein the alignment tool is configured to interact with the first reference such that the vertical member is in alignment when the alignment mark is aligned with the first reference.

20. The method of claim 15, wherein the first reference generator comprises a laser source generating a laser beam.

* * * * *